United States Patent

Schenk et al.

[11] Patent Number: 5,382,288
[45] Date of Patent: Jan. 17, 1995

[54] AZO PIGMENT PREPARATION

[75] Inventors: Karl H. Schenk, Idstein/Taunus; Angelika Heinrichs, Seeheim-Jugenheim; Hans J. Metz, Darmstadt, all of Germany

[73] Assignee: Hoechst Aktiengesellschaft, Frankfurt am Main, Germany

[21] Appl. No.: 54,004

[22] Filed: Apr. 26, 1993

[30] Foreign Application Priority Data

Apr. 25, 1992 [DE] Germany ............................ 4213705

[51] Int. Cl.⁶ ............................................. C09D 11/02
[52] U.S. Cl. .................................. 106/496; 106/20 R
[58] Field of Search ................... 106/496, 21 D, 23 K, 106/22 K, 20 R

[56] References Cited

U.S. PATENT DOCUMENTS

| | | | |
|---|---|---|---|
| 3,120,508 | 2/1964 | Braun et al. | 534/581 |
| 3,874,869 | 4/1974 | Koppensteiner et al. | 71/61 |
| 3,892,806 | 7/1974 | Eckert et al. | 564/153 |
| 3,905,825 | 9/1975 | Gaetani et al. | 106/496 |
| 3,965,265 | 6/1976 | Koppensteiner et al. | 424/204 |
| 3,977,859 | 8/1976 | Eckert et al. | 71/67 |
| 4,515,639 | 5/1985 | Dopfer et al. | 106/496 |

FOREIGN PATENT DOCUMENTS

| | | |
|---|---|---|
| 0044475 | 1/1982 | European Pat. Off. . |
| 0057880 | 8/1982 | European Pat. Off. . |
| 0062304 | 10/1982 | European Pat. Off. . |
| 0189385 | 7/1986 | European Pat. Off. . |
| 0193022 | 9/1986 | European Pat. Off. . |
| 1173601 | 7/1964 | Germany . |
| 1544494 | 3/1971 | Germany . |
| 1469782 | 11/1971 | Germany . |
| 2162617 | 7/1972 | Germany . |
| 2220016 | 11/1973 | Germany . |
| 2220026 | 11/1973 | Germany . |
| 3104257 | 2/1983 | Germany . |
| 3913667 | 1/1991 | Germany . |
| 1080115 | 8/1963 | United Kingdom . |
| 1119761 | 7/1968 | United Kingdom . |
| 1156835 | 7/1969 | United Kingdom . |
| 91/09063 | 6/1991 | WIPO . |

Primary Examiner—Helene Klemanski
Assistant Examiner—Scott L. Hertzog
Attorney, Agent, or Firm—Connolly & Hutz

[57] ABSTRACT

Azo pigment preparations essentially comprising
 a) an amide or a mixture of amides obtainable from the reaction
  a1) of an aminocarboxylic acid or
  a2) a lactam, in each case in the presence of a long-chain primary or secondary aliphatic amine or
  a3) of a dicarboxylic acid, a diamine and a long-chain primary or secondary aliphatic amine with one another,
 b) at least one diamine,
 c) at least one long-chain primary or secondary aliphatic amine,
 d) at least one azo pigment and
 e) if desired, further customary additives upon incorporation in halftone intaglio printing inks give glossy prints of high color strength which do not strike through even thin papers.

20 Claims, No Drawings

AZO PIGMENT PREPARATION

The present invention is in the technical field of azo pigment preparations and their use in printing inks.

GB-A-1,156,835 has disclosed that easily dispersible pigments are obtained by adding long-chain amines of the tallow fatty propylenediamine type during coupling. However, these pigment preparations have the disadvantage that intaglio printing inks prepared by means of these preparations strike through thin papers.

US-PS-4,515,639 describes that readily flowable and easily dispersible azo pigment preparations of high color strength are obtained by adding a low-chain aliphatic primary amine and an aliphatic diamine before, during or after coupling. The pigment preparations prepared in this manner give printing inks which, when used for printing on thin paper, do not strike through. However, owing to the increased demands in half-tone intaglio printing, a further increase in color strength and gloss must be aimed at.

International Patent Application WO 91/09063 describes low-molecular-weight copolymers comprising an α-olefin and an unsaturated carboxylic acid in which all carboxyl groups have been reacted with at least one amino acid to give the amide. These copolymer amides are used for the flushing of pigments.

EP-A2-0,189,385 describes dispersants comprising polyester amides, salts of carboxylic acids and diamines and free carboxylic acids or free diamines, which dispersants effect dispersion of solids, in particular pigments, in organic solvents.

Accordingly, the object of the present invention was to provide azo pigment preparations which are superior to the hitherto known azo pigment preparations with respect to gloss and color strength and which on thin paper do not strike through.

It has been found that azo pigment preparations containing at least one amide obtainable from the reaction of an aminocarboxylic acid or of a lactam in the presence of a long-chain primary or secondary aliphatic amine or obtainable from the reaction of a dicarboxylic acid, a diamine and a long-chain primary or secondary aliphatic amine with one another, and at least one diamine and at least one long-chain primary or secondary aliphatic amine achieve the object according to the invention.

The present invention relates to azo pigment preparations essentially comprising components a) to d) and, if desired, e) further customary additives, a) an amide or a mixture of amides obtainable from the reaction of a1) an aminocarboxylic acid of the formula $H_2N-CR^1R^2)_{m4}-COOH$ or a2) a lactam of the formula

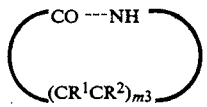

a3) a dicarboxylic acid of the formula $HOOC-(CR^1R^2)_{m1}-COOH$ or of an olefinic dicarboxylic acid of the formula $HOOC-CR^1=CR^2-COOH$ or an anhydride on which the dicarboxylic acid mentioned is based and a diamine of the formula $H_2N-(CR^1R^2)_{m2}-NH_2$, in the presence of at least one long-chain primary or secondary aliphatic amine of the formula (III)

$$R^3R^4R^5N \qquad (III)$$

in which $R^1$ and $R^2$, independently of one another are each hydrogen or $C_1-C_4$-alkyl, but preferably hydrogen, m3 is an integer from 3 to 12, preferably from 5 to 12, m4 is an integer from 1 to 15, preferably from 3 to 12, $R^3$ is hydrogen, $C_4-C_{25}$-alkyl or $C_4-C_{25}$-alkenyl, preferably hydrogen, $C_{10}-C_{25}$-alkenyl or $C_{10}-C_{25}$-alkyl, $R^4$ is hydrogen, $C_4-C_{25}$-alkyl, $C_4-C_{25}$-alkenyl or $-[-(CR^1R^2)_{m5}-NR^3]_p-R^{30}$, preferably hydrogen, $C_{10}-C_{25}$-alkyl, $C_{10}-C_{25}$-alkenyl or $-[-(CH_2)_{m5}-NR^3-]_p-R^{30}$, $R^5$ is hydrogen or $-[-(CR^1R^2)_{m5}-NR^3-]_p-R^{30}$, in which $R^1$ and $R^2$ are preferably hydrogen, $R^{30}$, independently of $R^3$, has the meaning given above for $R^3$, p is an integer from 1 to 8, preferably 1 to 4, m1 is an integer from 1 to 10, preferably 1 to 8, m2 is an integer from 2 to 14, preferably 2 to 10, and m5 is an integer from 2 to 14, preferably 2 to 10, with the proviso that $R^3$, $R^4$ and $R^5$ are not simultaneously hydrogen, b) at least one diamine of the formula (II)

$$H_2N-A-NH_2 \qquad (II)$$

in which A is a divalent aliphatic hydrocarbon radical having 6 to 30, preferably 6 to 24, carbon atoms;

c) at least one long-chain primary or secondary aliphatic amine of the abovementioned formula (III) or a salt of this amine and d) at least one azo pigment.

Alkenyl radicals are also understood to mean those containing up to three olefinic double bonds.

The amides obtainable by the reaction according to a1) or a2) are preferably those of the formula (Ia)

$$Z^1-[-CO-(CR^1R^2)_m-NH-]_z-H \qquad (Ia),$$

$Z^1$ being hydroxyl or $-NR^3R^4$ and z being an integer from 1 to 20, preferably 2 to 10, in particular 2 to 6, m, in the case of reaction a1), having the meaning of m4 and, in the case of reaction a2), having the meaning of m3, and $R^4$ being hydrogen, $C_4-C_{25}$-alkyl or $C_4-C_{25}$-alkenyl, preferably hydrogen, $C_{10}-C_{25}$-alkyl or $C_{10}-C_{25}$-alkenyl, and $R^1$, $R^2$, $R^3$, m3 and m4 having the abovementioned meanings;

and those of the formula (Ib)

$$Z^2-[-NR^3-(CR^1R^2)_{m5}-]_p-NR^3-[-CO-(CR^1R^2)_m-NH-]_z-H \qquad (Ib),$$

in which $Z^2$ is hydrogen, $C_4-C_{25}$-alkyl, $C_4-C_{25}$-alkenyl or $H_2N-(CR^1R^2)_m-CO-$ and $R^1$, $R^2$, $R^3$, m, m5, p and z have the abovementioned meanings.

The aminocarboxylic acid or the lactam are made to react with the amine of the formula (III) in a molar ratio of 1:2 to 10:1, preferably 1:1 to 2:1. In the case of a molar ratio of about 1:1, for example, a mixture of a total of about 80% by weight of the dimeric (z=2) and trimeric (z=3) condensation products is formed, while tetrameric (z=4) and pentameric (z=5) condensation products together amount to about 20% by weight. Hexameric (z=6) and higher polymers are formed in this reaction in very small amounts. Furthermore, homopolymers of the lactam used or of the aminocarboxylic acid which have not reacted with an amine of the formula (III) but also serve the purpose according to the invention and also form part of the subject-matter of the present invention can also be formed.

The amides obtainable by the reaction a3) are preferably those of the formula (Ic)

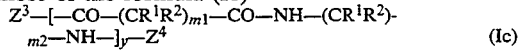

$$Z^3-[-CO-(CR^1R^2)_{m1}-CO-NH-(CR^1R^2)-_{m2}-NH-]_y-Z^4 \qquad (Ic)$$

in which, independently of one another, $R^1$, $R^2$, m1 and m2 have the meanings defined above, $Z^3$ is hydroxyl or $-NR^3R^4$, $Z^4$ is hydrogen, $-CO-(CR^1R^2)_{m1}-COOH$ or $-CO-(CR^1R^2)_{m1}-CONR^3R^4$, $R^3$ and $R^4$ are hydrogen, $C_4$-$C_{25}$-alkyl or $C_4$-$C_{25}$-alkenyl, and y is an integer from zero to 10, preferably 1 to 6, $Z^3$, in the case where y is zero, having the meaning $-NR^3R^4$ and $Z^4$ having the abovementioned meanings with the exception of hydrogen;

or of the formula (Id)

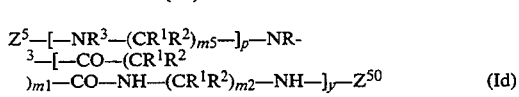

$$Z^5-[-NR^3-(CR^1R^2)_{m5}-]_p-NR-^3-[-CO-(CR^1R^2)_{m1}-CO-NH-(CR^1R^2)_{m2}-NH-]_y-Z^{50} \qquad (Id)$$

in which $R^1$, $R^2$, $R^3$, p, y, m1, m2 and m5 have the meanings defined above, $Z^5$ and $Z^{50}$, independently of one another, are each hydrogen or $-CO-(CR^1R^2)_{m1}-COOH$, $Z^{50}$, in the case where y is zero, being $-CO-(CR^1R^2)-_{m1}-COOH$ or $-CO-(CR^1R^2)_{m1}-CONR^3R^4$, or of the formula (Ie)

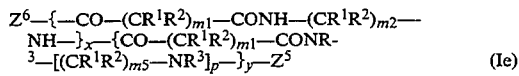

$$Z^6-\{-CO-(CR^1R^2)_{m1}-CONH-(CR^1R^2)_{m2}-NH-\}_x-\{CO-(CR^1R^2)_{m1}-CONR-^3-[(CR^1R^2)_{m5}-NR^3]_p-\}_y-Z^5 \qquad (Ie)$$

in which $Z^6$ is hydroxyl or $H_2N-(CR^1R^2)_{m2}-NH-$ or $HR^3N-[(CR^1R^2)_{m5}-NR^3]_p-$ and x is an integer from zero to 10, preferably zero to 6.

The dicarboxylic acid, the diamine of the formula $H_2N-(CR^1R^2)_{m2}-NH_2$ and the amine of the formula (III) are advantageously made to react with one another in a molar ratio of 1:1:1 to 1:1.3:6, preferably about 1:1:4. The molar ratio of about 1:1 between the dicarboxylic acid and the diamine mentioned constitutes a preferred embodiment but is not absolutely necessary for achieving the object according to the invention. Predominantly, mixtures of condensation products composed in each case of 1 to 10 structural units of the dicarboxylic acid, the diamine of the formula $H_2N-(CR^1R^2)_{m2}-NH_2$ and the amine of the formula (III) are formed. In the abovementioned condensation products, the structural units on which the dicarboxylic acid, the diamine and the amine of the formula (III) are based are also present in a ratio of 1:1:1 to 1:1.3:6, preferably about 1:1:4, in accordance with the molar amounts used of these starting compounds. Moreover, copolymers of the dicarboxylic acid used and of the diamine used which have not reacted with an amine of the formula (III) but also serve the purpose according to the invention and also form part of the subject-matter of the present invention can be formed. In the case where the amine of the formula (III) is a di-, tri- or polyamine, it is furthermore possible that copolymers of the dicarboxylic acid used and of the amine of the formula (III) which have not reacted with a diamine of the formula $H_2N-(CR^1R^2)_{m2}-NH_2$ but also serve the purpose according to the invention and also form part of the present invention can also be formed.

a1) The reaction is carried out at a temperature between 170° and 250° C. over a period of 5 to 15 hours with acid catalysis. Acids which can be used in this context are organic or inorganic acids, for example hydrochloric acid, sulfonic acid, phosphoric acid, toluenesulfonic acid, formic acid, acetic acid or mixtures of these acids. The molar weight ratios used of aminocarboxylic acid to amine of the formula (III) are between 1:2 and 10:1, preferably between 1:1 and 2:1. The use of solvents can be omitted. Workup, for example, a purification step or a separation process, is not required.

Examples of aminocarboxylic acids which are suitable according to the invention are: glycine, β-alanine, 4-aminobutyric acid, 5-aminopentanoic acid, 6-aminohexanoic acid, 7-aminoheptanoic acid, 8-aminooctanoic acid, 9-aminononanoic acid, 10-aminodecanoic acid, 11-aminoundecanoic acid, 12-aminododecanoic acid, $C_3$-$C_{15}$-aminocarboxylic acids having a branched $C_3$-$C_{14}$-alkyl radical and $C_3$-$C_{15}$-aminocarboxylic acids whose $NH_2$ group is bound to a tertiary carbon atom. Preferred aminocarboxylic acids in accordance with the present invention are aminocaproic acid (6-aminohexanoic acid), 11-aminoundecanoic acid and 8-aminooctanoic acid.

a2) The reaction is advantageously carried out in the same manner as described in a1). The molar weight ratios used of lactam to amine of the formula (III) are between 1:2 and 10:1, preferably between 1:1 and 2:1.

Examples of lactams which are suitable according to the invention are: caprolactam, caprylolactam, enantholactam and laurolactam, preferably caprolactam and laurolactam.

a3) The reaction is advantageously carried out in the same manner as described above in a1) and a2). The molar weight ratios used of dicarboxylic acid to diamine and to amine of the formula (III) are 1:1:1 to 1:1.3:6, preferably about 1:1:4. Instead of the dicarboxylic acid, the anhydride of the corresponding dicarboxylic acid can also be used.

Examples of dicarboxylic acids which are suitable according to the invention are: malonic acid, succinic acid, glutaric acid, adipic acid, pimelic acid, suberic acid, sebacic acid, maleic acid and fumaric acid, in particular adipic acid and sebacic acid.

Examples of diamines of the formula $H_2N-(CR^1R^2)_{m2}-NH_2$ which are suitable according to the invention are: ethylenediamine, tri-, tetra-, penta-, hexa-, hepta-, octa-, nona- and decamethylenediamine, in particular ethylenediamine, propylenediamine and hexamethylenediamine.

Amines of the formula (III) which are suitable according to the invention are long-chain primary or secondary aliphatic amines, for example primary alkylamines, such as tallow fatty amine, coconut fatty amine, oleylamine or stearylamine, and secondary alkylamines, such as distearylamine, di(coconut fatty) amine or dioleylamine, alkylalkylenediamines, such as N,N'-di(- fatty alkyl)-ethylenediamine, tallow fatty propylenediamine, or triamines, such as N,N'-bis(3-aminopropyl) tallow fatty amine, and mixtures of the amines mentioned.

The amines of the formula (III) can also be used in the form of their salts, for example hydrochlorides or acetates.

Reaction products of the caprolactam type with tallow fatty propylenediamine are described in U.S. Pat. Nos. 3,892,806 and 3,965,265 and are used as antimicrobial agents.

The products obtainable by reaction a1), a2) or a3) can be used directly or as an aqueous, aqueous hydrochloric acid or aqueous acetic acid emulsion for the purpose according to the invention.

b) Suitable diamines of the formula (II) are in particular those whose radical A has a number of 6 to 24 carbon atoms. A can be straight-chain or branched and contain cycloaliphatic rings. Preferred radicals A are:

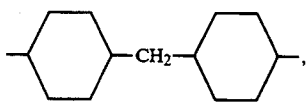

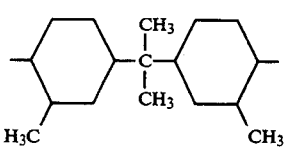

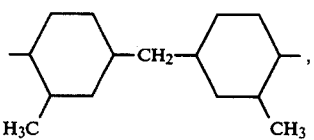

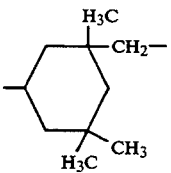

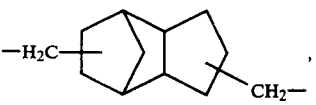

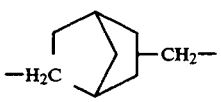

—(CH$_2$)$_6$—

—CH$_2$—C(CH$_3$)$_2$—CH$_2$—CH(CH$_3$)—CH$_2$—CH$_2$—.

The use of cycloaliphatic amines as additive in the preparation of azo pigments has already been disclosed in U.S. Pat. No. 4,515,639. However, the products thus obtained show significantly less color strength and gloss.

d) Suitable azo pigments are any azo pigments used in halftone intaglio printing inks, preferably those from the acetoacetylarylamide series, in particular C.I. Pigment Yellow 12 (C.I. No. 21090), 13 (C.I. No. 21100), 14 (C.I. No. 21095), 16 (C.I. No. 20040), 17 (C.I. No. 21105), 83, 106, 114, 126 and 127.

The present invention furthermore relates to a process for the preparation of azo pigment preparations, which comprises adding the amides obtainable by a reaction according to a1), a2) or a3), at least one diamine of the formula (II) and at least one amine of the formula (III) before, during or after azo coupling, preferably before azo coupling. However, the amine of the formula (III) need not be added in a separate step if the amine of the formula (III) is used in the reaction according to a1), a2) or a3) in such an excess that the amount of this amine, by virtue of this excess, is already sufficient for the purpose according to the invention.

The amount of the amide or amides according to reaction a) in the azo pigment preparation according to the invention is between 5 and 50% by weight, preferably between 35 and 45% by weight, relative to the weight of the azo pigment. The amount of the diamine or diamines of the formula (II) in the azo pigment preparation according to the invention is between 2 and 20% by weight, preferably 4 and 12% by weight, and the amount of the amine or amines of the formula (III) is between 5 and 40% by weight, preferably 10 and 30% by weight, each relative to the weight of the azo pigment.

By varying the amounts of the amides and the diamines of the formula (II), the strike-through characteristics and the shading can each be varied depending on the properties desired. The favorable relations can be easily determined by simple preliminary experiments.

e) Furthermore, it is advantageous to add an emulsifier to the coupling mixture. Commonly used emulsifiers, such as long-chain amine oxides and phosphine oxides, in particular salts of long-chain amines, are used for this purpose. Salts of long-chain amines can be converted into the amines by an alkaline treatment of the pigments and also serve as preparation agents in this form. Emulsifiers of this type are disclosed in U.S. Pat. No. 3,120,508 and GB-A-1,119,761.

Furthermore, it may be advantageous to add a cationic compound of the phase-transfer catalyst type instead of the emulsifier or in addition to it. Suitable compounds are, inter alia, stearyltrimethylammonium chloride or dodecylbenzyldimethylammonium chloride.

The emulsifiers and cationic compounds are used in amounts customary in practice, for example up to about 15% by weight of emulsifier, relative to the weight of the coupling component, and up to 8% by weight of cationic compound, relative to the weight of the pigment.

The azo pigment preparations according to the invention have very high color strength and, upon incorporation in halftone intaglio printing inks, they produce glossy prints of high color strength which do not strike through even thin papers. Accordingly, the present invention also relates to the use of the azo pigment preparations according to the invention for the preparation of halftone intaglio printing inks.

In the examples which follow, percentages are by weight.

Preparation Examples

1) Amides obtained from tallow fatty propylenediamine and ε-caprolactam in a ratio of 1:1 a) 2720 g (8 mol) of tallow fatty propylenediamine and 905 g (8 mol) of ε-caprolactam are melted at 70° C., and 46 g of 31% hydrochloric acid are added. The melt is heated at 180 to 250° C. for 5 to 15 hours under a nitrogen atmosphere, during which an aqueous distillate is distilled off. The reaction product is a light-colored melt which solidifies at temperatures below 100° C.

b) 113 g (1 mol) of ε-caprolactam and 340 g (1 mol) of tallow fatty propylenediamine are mixed with 10 g of 31% hydrochloric acid and 1060 ml of water, and the mixture is refluxed for 5 to 10 hours. This gives a creamy, 30% aqueous emulsion which can be metered directly into the azo coupling mixture.

c) 113 g (1 mol) of ε-caprolactam and 340 g (1 mol) of tallow fatty propylenediamine are mixed with 10 g of HCl and reacted as in Preparation Example 1a). The hot melt is stirred into 1000 ml of water and 60 ml of acetic acid (100% pure). This gives a highly fluid 30% aqueous acetic acid emulsion which can be metered directly into the azo coupling mixture.

2) Amides obtained from ε-caprolactam and tallow fatty propylenediamine in a ratio of 1.5:1.

2040 g (6 mol) of tallow fatty propylenediamine are melted at 120° C., 1017 g (9 mol) of ε-caprolactam and 30 ml of 31% hydrochloric acid are added, and the mixture is heated at 180° to 250° C. for 5 to 15 hours. The product is isolated without workup.

3) Amides obtained from-N,N-bis(3-aminopropyl) tallow fatty amine and ε-caprolactam 191 g (0.5 mol) of N,N-bis(3-aminopropyl) tallow fatty amine and 57 g (0.5 mol) of ε-caprolactam are mixed with 10 ml of 31% hydrochloric acid, and the mixture is heated at 180° to 250° C. for 5 to 15 hours. The product is isolated without workup and solidifies below 100° C. to give a paste-like mass.

4) ε-Caprolactam oligomers 180 ml of 31% hydrochloric acid are added to 3000 g (26.5 mol) of ε-caprolactam, and the mixture is heated at 180° to 250° C. for 1 to 3 hours. After unreacted monomer has been distilled off, the white solid product is ground.

5) Amides obtained from adipic acid, hexamethylenediamine and tallow fatty propylenediamine 680 g (2 mol) of tallow fatty propylenediamine, 73 g (0.5 mol) of adipic acid and 58 g (0.5 mol) of hexamethylenediamine are heated at 180° to 250° C. for 5 to 15 hours. This gives a light-colored melt which turns into a paste below 100° C.

Use Examples 1a) 1040 g of 3,3'-dichloro-4,4'-diaminobiphenyl are stirred with 2700 ml of 31% hydrochloric acid and bisdiazotized with 1150 ml of 38% sodium nitrite solution at a temperature of 0° to 15° C.

160 g of oleylamine acetate and 240 g of acetic acid (100% pure) are initially introduced into 4 l of water, and an emulsion of 1600 g of amide according to Preparation Example 1 in 4 l of water is added. 1460 g of acetoacetylaminobenzene are added to this mixture in portions, and the pH is brought to 5.5. Coupling is carried out by running the bisdiazonium salt solution slowly into the suspension of the coupling component, while maintaining the pH at about 4.5 by simultaneously running in sodium hydroxide solution in a controlled manner.

After coupling is complete, the suspension is heated to about 70° C. and 180 g of bis(4-aminocyclohexyl)methane and 66 g of dodecylbenzyldimethylammonium chloride are added. After the pH has been brought to 5.5, the mixture is heated to 90° to 100° C. and this temperature is maintained for 1 hour. The batch is then made alkaline with 1080 ml of 33% sodium hydroxide solution and maintained at 90° to 100° C. for several hours. The product is then filtered, washed, dried and ground. On natural paper, it produces glossy prints of high color strength, which on printing on thin paper do not strike through.

b) The procedure described above is repeated, except that only 20 g of acetic acid (100% pure) are initially introduced instead of 240 g and 5.6 l of the emulsion from Preparation Example 1c) are added. Glossy prints of high color strength are obtained which on printing on thin paper do not strike through.

2a) The procedure of Use Example 1a) is repeated, except that a mixture of 800 g of ε-caprolactam oligomers and 800 g of tallow fatty propylenediamine according to Preparation Example 4 are used and 254 g of bis(4-aminocyclohexyl)methane and 200 g of dodecylbenzyldimethylammonium chloride are added, giving a product which produces glossy prints of high color strength which on printing on thin paper do not strike through.

b) The procedure of Use Example 1a) is repeated, except that a mixture of 200 g of tallow fatty propylenediamine and 1400 g of amide is used, giving glossy prints of high color strength.

3) The procedure of Use Example 2 is repeated, except that a reaction product of adipic acid with hexamethylenediamine and tallow fatty propylenediamine according to Preparation Example 5 is used, likewise giving products which produce glossy prints of high color strength which on printing on thin paper do not strike through.

4) The procedure of Use Example 2 is repeated, except that the reaction product of N,N-bis(3-aminopropyl) tallow fatty amine with ε-caprolactam according to Preparation Example 3 is used, giving a pigment which produces reddish and glossy prints of high color strength without striking through thin papers.

5) The procedure of Use Example 1 is repeated, except that 220 g of bis(4-aminocyclohexyl)methane and 150 g of dodecylbenzyldimethylammonium chloride are added, giving a more reddish pigment than in Use Example 1.

6) The procedure of Use Example 1 is repeated, except that the reaction product of tallow fatty propylenediamine with ε-caprolactam in a ratio of 1:1.5 according to Preparation Example 2 is used, giving pigments which produce glossy prints of very high color strength without deterioration in the strike-through characteristics.

7) The procedure of Use Example 1 is repeated, except that 5340 g of the 30% aqueous emulsion of the reaction product of tallow fatty propylenediamine with ε-caprolactam according to Preparation Example 1b is used, giving pigments which produce glossy prints of high color strength.

8) The procedure of Use Example 2 is repeated, except that a mixture of 1200 g of ε-caprolactam oligomers according to Preparation Example 4 and 400 g of tallow fatty propylenediamine is used, giving pigments which produce glossy prints of high color strength.

What is claimed:

1. An azo pigment preparation comprising components a) to d):
a) an amide or a mixture of amides obtained from the reaction of the components comprising:
a1) an aminocarboxylic acid of the formula $H_2N-(CR^1R^2)_{m4}-COOH$ or a2) a lactam of the formula

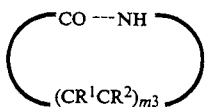

or a3) a dicarboxylic acid of the formula HOO-C—$(CR^1R^1)_{m1}$—COOH or an anhydride thereof or an olefinic dicarboxylic acid of the formula HOOC—$CR^1$=$CR^2$—COOH or an anhydride thereof and a diamine of the formula $H_2N$—$(CR^1R^2)_{m2}$—$NH_2$, in the presence of at least one long-chain primary or secondary aliphatic amine of the formula (III)

$R^3R^4R^5N$      (III)

in which $R^1$ and $R^2$, independently of one another are each hydrogen or $C^1$–$C^4$-alkyl, m3 is an integer from 3 to 12, m4 is an integer from 1 to 15, $R^3$ is hydrogen, $C^4$–$C_5$-alkyl or $C_4$–$C_{25}$-alkenyl, $R^4$ is hydrogen, $C_4$–$C_{25}$-alkyl, $C_4$–$C_{25}$-alkenyl or —$[$—$(CR^1R^2)_{m5}$—$NR^3]_p$—$R^{30}$, $R^{30}$, independently of $R^3$, has the meaning given above for $R^3$, $R^5$ is hydrogen or —$[$—$(CR^1R^2)_{m5}$—$NR^3$—$]_p$—$R^{30}$, p is an integer from 1 to 8, m1 is an integer from 1 to 10, m2 is an integer from 2 to 14, and m5 is an integer from 2 to 14, with the proviso that $R^3$, $R^4$ and $R^5$ are not simultaneously hydrogen, b) at least one diamine of the formula (II)

$H_2N$—A—$NH_2$      (II)

in which A is a divalent aliphatic hydrocarbon radical having 6 to 30 carbon atoms;

c) at least one long-chain primary or secondary aliphatic amine of the abovementioned formula (III) or a salt of this amine and d) at least one azo pigment.

2. An azo pigment preparation as claimed in claim 1, wherein the amides obtained according to a1) or a2) have the formulae (Ia) or (Ib)

$Z^1$—$[$—CO—$(CR^1R^2)_m$—NH—$]_z$—H      (Ia)

$Z^1$ being hydroxyl or —$NR^3R^4$ and z being an integer from 1 to 20, m, in the case of reaction a 1), having the meaning of m4 and, in the case of reaction a2), having the meaning of m3, and $R^4$ being hydrogen, $C_4$–$C_{25}$-alkyl or $C_4$–$C_{25}$-alkenyl, $R^1$ and $R^2$, independently of one another, each being hydrogen or $C_1$–$C_4$-alkyl, $R^3$ being hydrogen, $C_4$–$C_{25}$-alkyl or $C_4$–$C_{25}$-alkenyl, m3 being an integer from 3 to 12 and m4 being an integer from 1 to 15;

$Z^2$—$[$—$NR^3$—$(CR_1R^2)_{m5}$—$]_p$—$NR^3$—$[$—CO—$(CR_1R^2)_m$—NH—$]_z$—H      (Ib)

in which $Z^2$ is hydrogen, $C_4$–$C_{25}$-alkyl, $C_4$–$C_{25}$-alkenyl or $H_2N$—$(CR^1R^2)_m$—CO—, m5 is an integer from 2 to 14, p is an integer from 1 to 8, and $R^1$, $R^2$, $R^3$, m and z have the abovementioned meanings.

3. An azo pigment preparation as claimed in claim 1, wherein the amides obtained according to a1) or a2) have the formulae (Ia) or (Ib)

$Z^1$—$[$—CO—$(CR^1R^2)_m$—NH—$]_z$—H      (Ia)

$Z^1$ being hydroxyl or —$NR^3R^4$ and z being an integer from 2 to 10, m, in the case of reaction a1), having the meaning of m4 and, in the case of reaction a2), having the meaning of m3, and $R^4$ being hydrogen, $C_{10}$–$C_{25}$-alkyl or $C_{10}$–$C_{25}$-alkenyl, $R^1$ and $R^2$ each being hydrogen, $R^3$ being hydrogen, $C_{10}$–$C_{25}$-alkyl or $C_{10}$–$C_{25}$-alkenyl, m3 being an integer from 5 to 12 and m4 being an integer from 3 to 12;

$Z^2$—$[$—$NR^3$—$(CR^1R^2)_{m5}$—$]_p$—$NR^3$—$[$—CO—$(CR^1R^2)_m$—NH—$]_z$—H      (Ib)

in which $Z^2$ is hydrogen, $C_4$–$C_{25}$-alkyl, $C_4$–$C_{25}$-alkenyl or $H_2N$—$(CR^1R^2)_m$—CO—, m5 is an integer from 2 to 10, p is an integer from 1 to 4, and $R^1$, $R^2$, $R^3$, m and z have the abovementioned meanings.

4. An azo pigment preparation as claimed in claim 1, wherein the amides obtained according to a3) have the formulae (Ic), (Id) or (Ie)

$Z^3$—$[$—CO—$(CR^1R^2)_{m1}$—CO—NH—$(CR^1R^2)_{m2}$—NH—$]_{y13}$ $Z^4$      (Ic)

in which, independently of one another, $R^1$, $R^2$, m1 and m2 have the meanings defined in claim 1, $Z^3$ is hydroxyl or -$NR^3R^4$, $Z^4$ is hydrogen, —CO—$(CR^1R^2)_{m1}$—COOH or —CO—$(CR^1R^2)_{m1}$—$CONR^3R^4$, $R^3$ and $R^4$ are hydrogen, $C_4$–$C_{25}$-alkyl or $C_4$–$C_{25}$-alkenyl, and y is an integer from zero to 10, $Z^3$, in the case where y is zero, having the meaning —$NR^3R^4$ and $Z^4$ having the abovementioned meanings with the exception of hydrogen; or of the formula (Id)

$Z^5$—$[$—$NR^3$—$(CR^1R^2)_{m5}13$ $]_p$—$NR^3$—$[$—CO—$(CR^1R^2)_{m1}$—CO—NH—$(CR^1R^2)_{m2}$—NH—$]_y$—$Z^{50}$      (Id)

in which $R^1$, $R^2$, $R^3$, y, m1 and m2 have the meanings as defined in claim 1, p is an integer from 1 to 8, m5 is an integer from 2 to 14, $Z^5$ and $Z^{50}$, independently of one another, are each hydrogen or —CO—$(CR^1R^2)_{m1}$—COOH, $Z^{50}$, in the case where y is zero, being —CO—$(CR^1R^2)_{m1}$—COOH or —CO—$(CR^1R^2)_{m1}$—$CONR^3R^4$, or of the formula (Ie)

$$Z^6-\{-CO-(CR^1R^2)_{m1}-CONH-(CR^1R^2)_{m2}-NH-\}_x-\{CO-(CR^1R^2)_{m1}-CONR^3-[(CR^1R^2)_{m5}-NR^3]_p-\}_y-Z^5 \quad (Ie)$$

in which $Z^6$ is hydroxyl or $H_2N-(CR^1R^2)_{m2}-NH-$ or $HR^3N-[(CR^1R^2)_{m5}-NR^3]_p-$ and x is an integer from zero to 10.

5. An azo pigment preparation as claimed in claim 4, wherein y is an integer from 1 to 6 and x is an integer from zero to 6.

6. An azo pigment preparation as claimed in claim 1, wherein radical A in the diamine of the formula (II) is a divalent aliphatic hydrocarbon radical having 6 to 24 carbon atoms.

7. An azo pigment preparation as claimed in claim 1, wherein in the amine of the formula (III)

$R^3$ is hydrogen, $C_{10}$–$C_{25}$-alkyl or $C_{10}$–$C_{25}$-alkenyl, $R^4$ is hydrogen $C_{10}$–$C_{25}$-alkyl, $C_{10}$–$C_{25}$-alkenyl or $-[-(CH_2)_{m5}-NR^3-]_p-R^{30}$ $R^{30}$, independently of $R^3$, has the meanings as claimed in claim 1 for $R^3$, m5 is an integer from 2 to 14, p is the numbers 1 to 8, and $R^5$ is hydrogen.

8. An azo pigment preparation as claimed in claim 1, wherein, in said component a, the weight ratio of said aminocarboxylic acid or said lactam to the amine of the formula (III) is between 1:2 and 10:1.

9. An azo pigment preparation as claimed in claim 1, wherein, in said component a, the weight ratio of said aminocarboxylic acid or said lactam to the amine of the formula (III) is between 1:1 and 2:1.

10. An azo pigment preparation as claimed in claim 1, wherein, in said component a, the weight ratios of said dicarboxylic acid to said diamine of said component a3) and the amine of the formula (III) are 1:1:1 to 1:1.3:6.

11. An azo pigment preparation as claimed in claim 1, wherein, in said component a, the weight ratios of said dicarboxylic acid to said diamine of said component a3) and the amine of the formula (III) are 1:1:4.

12. An azo pigment preparation as claimed in claim 1, wherein the azo pigment is an acetoacetylarylamide azo pigment.

13. An azo pigment preparation as claimed in claim 1, wherein the amount of said component a) in the azo pigment preparation is between 5 and 50% by weight, relative to the amount of the azo pigment.

14. An azo pigment preparation as claimed in claim 1, wherein the amount of said component a) in the azo pigment preparation is between 35 and 45% by weight, relative to the amount of the azo pigment.

15. An azo pigment preparation as claimed in claim 1, wherein the amount of the diamine of the formula (II) in the azo pigment preparation is between 2 and 20% by weight, relative to the weight of the azo pigment.

16. An azo pigment preparation as claimed in claim 1, wherein the amount of the diamine of the formula (II) in the azo pigment preparation is between 4 and 12% by weight, relative to the weight of the azo pigment.

17. An azo pigment preparation as claimed in claim 1, wherein the amount of the amine of the formula (III) in the azo pigment preparation is between 5 and 40% by weight, relative to the weight of the azo pigment.

18. An azo pigment preparation as claimed in claim 1, wherein the amount of the amine of the formula (III) in the azo pigment preparation is between 10 and 30% by weight, relative to the weight of the azo pigment.

19. A process for the preparation of an azo pigment preparation as claimed in claim 1, which comprises adding the amides obtained according to a1), a2) or a3), at least one diamine of the formula (II) and at least one amine of the formula (III) before, during or after the azo coupling.

20. Method of using an azo pigment preparation as claimed in claim 1, comprising the step of adding said azo pigment preparation to a halftone intaglio printing ink.

* * * * *